United States Patent [19]
Breed et al.

[11] Patent Number: 5,098,122
[45] Date of Patent: Mar. 24, 1992

[54] VELOCITY CHANGE SENSOR WITH IMPROVED SPRING BIAS

[75] Inventors: Allen Breed, Boontown Township, Morris County; Ted Thuen, Morris Plains; Carl Grossi, Wharton, all of N.J.

[73] Assignee: Breed Automotive, Boonton Township, N.J.

[21] Appl. No.: 587,262

[22] Filed: Sep. 24, 1990

Related U.S. Application Data

[63] Continuation-in-part of Ser. No. 447,108, Dec. 6, 1989.

[51] Int. Cl.$^5$ .................. H01H 35/14; B60R 21/32
[52] U.S. Cl. .................. 280/735; 200/61.53; 200/61.49; 180/282
[58] Field of Search .............. 280/735, 734; 180/282; 200/61.45 R, 61.48, 61.49, 61.51, 61.53

[56] References Cited

U.S. PATENT DOCUMENTS

| | | | |
|---|---|---|---|
| 3,141,936 | 7/1964 | Boyle | 200/61.53 |
| 3,509,299 | 4/1970 | Lawrie | 200/61.53 |
| 3,623,449 | 11/1971 | Knutson | 200/61.53 |
| 3,655,929 | 4/1972 | Engel | 280/735 |
| 4,161,228 | 7/1979 | Svensson | 180/282 |
| 4,594,485 | 6/1986 | Brown | 200/61.53 |
| 4,816,627 | 12/1987 | Janotik | |
| 4,857,680 | 8/1989 | Janotik | 200/61.45 R |
| 4,900,880 | 2/1990 | Breed | 200/61.53 |

Primary Examiner—Kenneth R. Rice
Assistant Examiner—Karin Tyson
Attorney, Agent, or Firm—Kane Dalsimer Sullivan Levy Eisele and Richard

[57] ABSTRACT

An accelerometer for a passenger restrain system in a motor vehicle includes a housing with a path for an inertial element, and a coil spring member for urging the inertial element toward a preselected position. When the vehicle decelerates at a rate higher than a preset rate, the ball moves away from the preselected position and closes an electrical contact.

14 Claims, 2 Drawing Sheets

VELOCITY CHANGE SENSOR WITH IMPROVED SPRING BIAS

RELATED APPLICATION

This application is a continuation-in-part of application Ser. No. 447,108 filed Dec. 6, 1989 entitled A VELOCITY CHANGE SENSOR WITH SPRING BIAS.

The subject matter of this application is further related to application Ser. No. 418,228 filed on Oct. 6, 1989 and entitled A VELOCITY CHANGE SENSOR WITH ADJUSTMENT SCREW now abandoned.

BACKGROUND OF THE INVENTION

1. Field of the invention

This invention pertains to a velocity change sensor or accelerometer used in motor vehicles for detecting sudden changes in velocity and for activating in response a passenger restraining device such as an air bag. More particularly, this device includes an element which moves to a preset position in response to a sudden deceleration to close pair of contact blades, said device also having a spring for biasing the element.

2. Background of the Invention

Studies have been made which indicate that injuries in motor vehicle accidents, especially at high speeds, can be substantially reduced or eliminated by the use of passenger restraint systems. (The term "passenger" is used to cover the driver of a car as well.) These systems include an inflatable balloon usually termed an air bag which normally is stored away in the instrument panel or the steering wheel. When the motor vehicle is subjected to a sudden deceleration, the air bag is inflated and is deployed automatically in a position which cushions the passengers, restrains their movement and prevents contact between them and the automobile interior such as the windshield, the steering wheel. The instrument panel and so on. Of course, a crucial element of all such systems is the velocity change sensor or accelerometer which initiates the inflation and deployment of the air bags. The motion of the motor vehicle must be carefully and precisely monitored so that the air bags can be deployed very fast, before the passengers suffer any substantial injury.

A velocity change sensor is disclosed in U.S. Pat. No. 4,329,549 assigned to the same company as the present invention. This sensor comprises a tubular housing surrounding a metallic shell, a metal ball and a magnet biasing the ball toward a first end of the shell. At the second end of the shell there are a pair of electrical contact blades. The sensor is positioned in the motor vehicle in an orientation such that when the motor vehicle experiences a deceleration which exceeds a preset level, the ball moves from the first toward the second end, making contact with the two blades. Because the blades and the ball are made of an electrically conducting material, when the ball contacts the blades, an electrical path is established between the two blades. This electrical path is used to initiate a signal for the deployment of the air bags.

Because the contacts must have a certain inherent flexibility they are normally made of steel, copper or an alloy thereof, while the ball is usually gold plated to insure a good electrical contact between the ball and the contact blades. Because of the difference in the electrochemical activity between these materials, corrosion due to electrolysis may occur which may form an insulating layer on the balls and/or the contact blades, thus causing the sensor to malfunction. This problem is further aggravated if the chamber holding the ball and the contacts is open to the atmosphere because fumes and other contaminants from the automobile engine.

Another problem with the prior art sensor described above is that the biasing force on the ball is generated by a permanent magnet. Since the magnet has to generate a relatively strong magnetic field, it is large and waste space.

OBJECTIVES AND SUMMARY OF THE INVENTION.

In view of the above mentioned disadvantages of the prior art, it is an objective of the present invention to provide a restraint system in which an inertial element is biased toward a preselected position by a coiled spring means, thereby eliminating the need for a permanent magnet.

A further objective is to provide a passenger restraint system with a sensor wherein an inertial element does not form a part of the electrical circuit used to activate an air bag, thereby eliminating the need of expansive coating on the element.

Yet another objective is to provide a passenger restraint system with a small and inexpensive accelerometer. Other objectives and advantages of the invention shall become apparent from the following description of the invention.

A passenger restraint system constructed in accordance with this invention comprises a housing with an inertial element movable in a predetermined path, and coiled spring means for biasing said element in a predetermined direction. In a crash, deceleration causes the inertial element to move along the path causing a change of state in a pair of electrical contacts coupled to an activation circuit for activating a restraint device such as an air bag. Preferably, the coiled spring means is integral with one of the contacts whereby the need for a separate contact is eliminated.

DETAILED DESCRIPTION OF THE INVENTION

Figure 1:
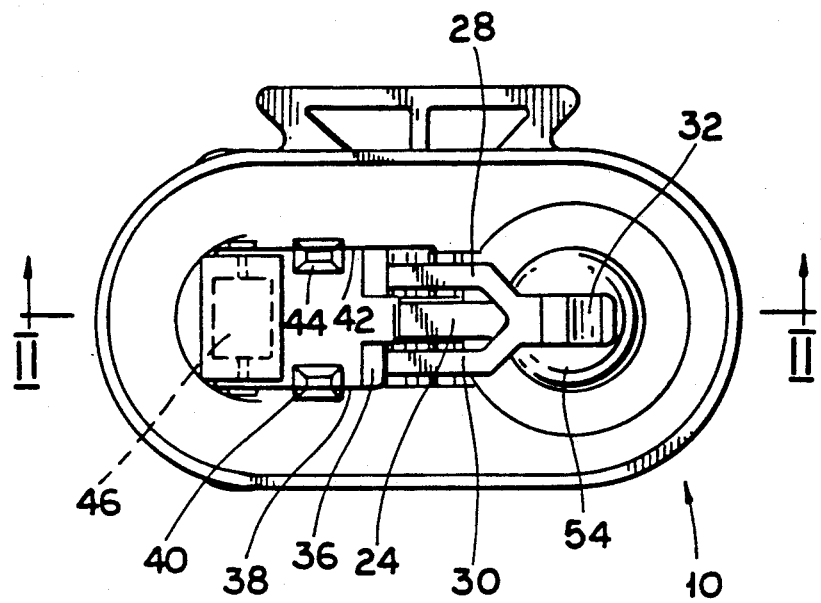
FIG. 1 shows a plan view of a sensor for a restraint device without a cover constructed in accordance with the invention.

In the following, terms such as up, down, above, below, vertical, horizontal, and so on, are used merely for facilitating the description of the invention. Turning now to the Figures, an accelerometer or velocity change sensor 10 constructed in accordance with this invention is usually disposed in a case mounted on the motor vehicle (not shown). The sensor is connected by a cable 12 with at least two conductors 14, 16 to a control device for the deployment of the air bag, described in more detail below.

The sensor has a generally oval housing 18 made of nonconducting material such as a moldable plastic material. The housing is made up of a body 18A and a cover 18B, and at one end it has a cylindrical inner chamber 20 defined in body 18A by tubular section 19A and cylinder 19B. Inside the housing, there is provided a stationary contact blade 22, having extensions generally perpendicular to side wall 24. More particularly, blade 22 includes a first extension 28 and a second extension 30 joined to form a common contact point. Blade 22 is affixed to an upright wall 36 of the housing by pins not shown.

Fixed contact 22 is connected by a coupling blade 38 to an upright post 40. Post 40 is, in turn, electrically connected to one of the wires such as wire 16.

Also, within housing 18 there is a movable contact blade 24 including a spring coil 24A and an arm 24B secured to coil 24A. Arm 24B terminates in a flattened end 24C. Spring coil 24A has a central portion 24D used to secure the whole contact to the housing. Movable contact 24 is electrically connected to a coupling blade 42 which, in turn, is connected to a second post 44. Post 44 is connected to the other of the two outside wires, i.e. 14. Preferably, both blades 38 and 42 extend beyond respective posts 40, 44. A resistor 46 is molded into housing 18 as shown with its two leads connected to blades 40, 42 respectively as shown. This resistor 46 is connected at all times across lines 14, 16 through blades 38, 42 and posts 40, 44 respectively.

Figure 2:
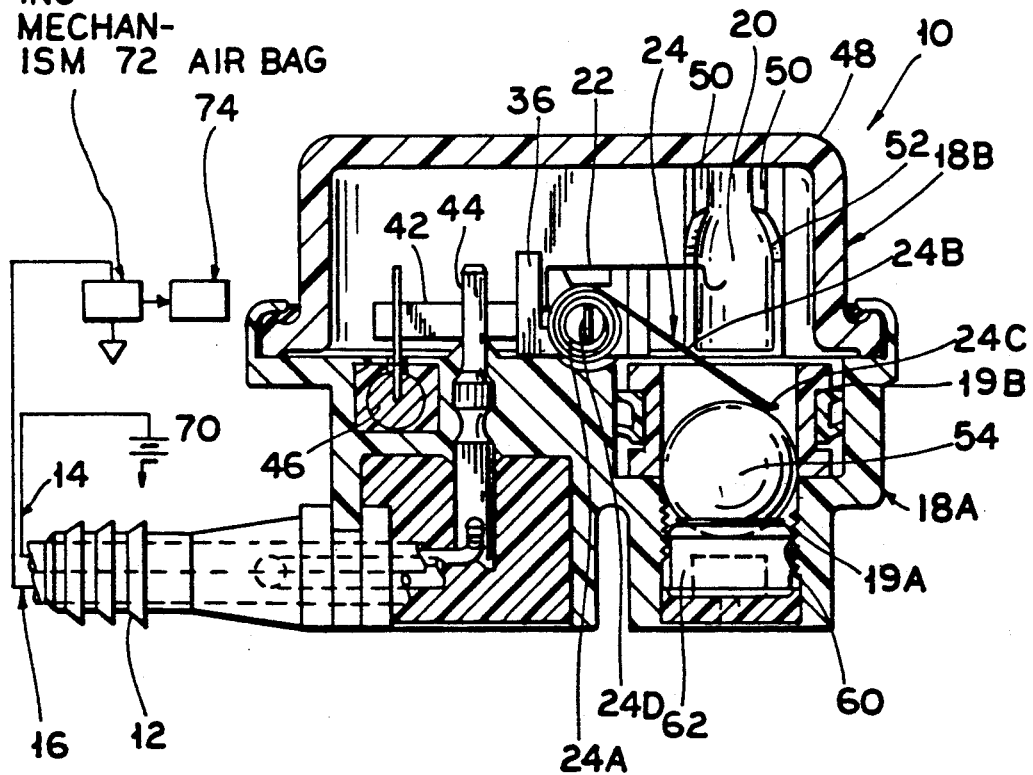
FIG. 2 shows a side elevational view of the sensor of FIG. 1 including a cover.
Figure 4:
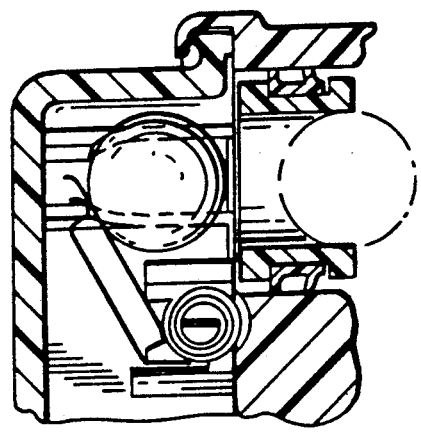
FIG. 4 shows the sensor of FIG. 3 with the inertial element in an end position.
Figure 3:
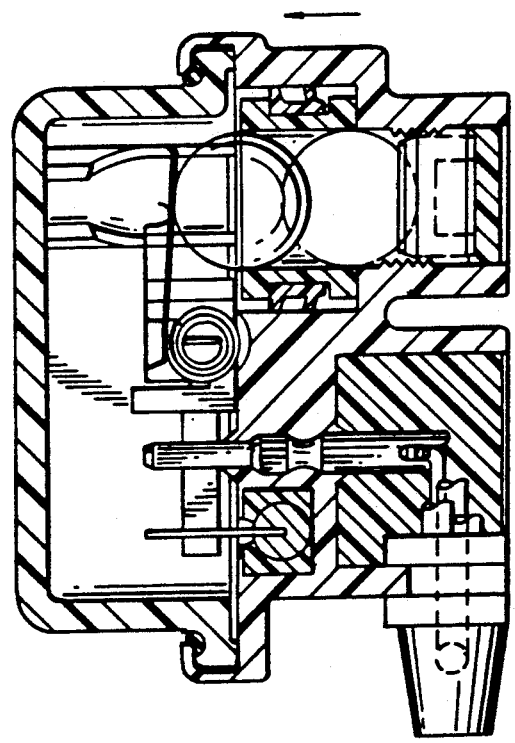
FIG. 3 shows a side elevational partial sectional view of the sensor of FIG. 2 with the inertial element in an intermediate position.

Housing cover 18B also has an upper wall 48. A plurality of ribs 50 extend downwardly from wall 48. At their upper ends, the ribs include arcuate portions 52. These ribs 50 cooperate to define the upper portion of the chamber 20 with contacts 22, 24 extending into the chamber. Disposed in chamber 20 there is an inertial element in the form for example, of a spherical ball 54 made of steel, or other relatively dense material. The ribs 50 are arranged and constructed to form a vertical (as seen in FIGS. 2, 3 and 4) tubular path for the ball 54.

The blades 22, 24 are made of a flexible conductive material such as steel, copper, or alloys thereof. As shown in FIG. 2, the blade 24 is arranged so that under normal conditions it applies a biasing force upward on ball 54 to maintain it in a rest position.

Preferably, the inside surface of tubular section 19A is threaded as at 60 to accept a screw-in plug 62.

The sensor is positioned in such an orientation that, when the vehicle is involved in a crash which results on a deceleration exceeding a preset level, the ball 54 overcomes the biasing force of blade 24 and starts moving upwards along the path defined by the ribs 50. As the ball moves upward, it bends blade 24 until this blade comes into electrical contact with blade 22 as shown in FIG. 3. The blades are part of an 10 electrical circuit, or other means of initiating of the bag deployment. For example, wire 14 may be coupled to a battery 70, and wire 16 could be coupled to an actuating mechanism 72. When the two blades 22, 24 touch, current flows from battery 72 to the mechanism 72 deploying air bag 74 (see FIG. 3). Resistor 46 is provided to allow a small amount of current to flow through the system to check system readiness.

After the two blades come into electric contact, if the deceleration on the vehicle is large enough, the ball continues its upward movement (in the orientation shown in the drawings) bending both blades 22, 24 until it is stopped by arcuate rib sections 52, as shown in FIG. 4. The combined forces of blades 22, 24 slow the ball down in this last movement reducing the impact between the ball 54 and housing 18.

Once the deceleration stops, the ball 54 is returned to its rest position of FIG. 2 by blades 24.

Obviously numerous modifications can be made to the invention without departing from its scope as defined in the appended claims.

I claim:

1. In a passenger restraint system for a motor vehicle, an accelerometer comprising:
   a. a housing;
   b. an inertial element;
   c. path means disposed in said housing for defining a path for said inertial element;
   d. contact means disposed in said housing; and
   e. spring coil means for urging said inertial element toward a preselected position on said path, said path being arranged and constructed to allow said inertial element to move away from said preselected position in the presence of a deceleration of said motor vehicle, said spring coil means including a blade attached to a spring coil, said blade having pivoted by the movement of said inertial element to contact said contact means.

2. The accelerometer of claim 1 further including indicating means disposed in said housing for indicating the position of said inertial element within said path.

3. The accelerometer of claim 2 wherein said indicating means include a pair of electrical contacts having an open and a closed contact position, said contact positions being defined by the position of said inertial element.

4. The accelerometer of claim 1 wherein said path means includes a chamber housing said inertial element.

5. An accelerometer for a passenger restraint system in a motor vehicle comprising:
   a housing;
   an inertial element disposed within said housing;
   c. path means for defining a path of movement for said inertial element;
   d. contact means disposed in said housing; and
   e. spring coil means for biasing said inertial element, said spring coil means including a flexible blade attached to a spring coil and arranged to urge said inertial element toward a rest position, said blade being pivoted by the movement of said inertial element to contact said contact means when said motor vehicle undergoes an acceleration.

6. The accelerometer of claim 5 further comprising indicating means for indicating the position of said inertial element within said housing.

7. The accelerometer of claim 5 wherein said contact means comprises a second blade.

8. The accelerometer of claim 7 wherein said first and second blades cooperate for slowing said inertial element down after contact is made between said first and said second blades.

9. The accelerometer of claim 5 wherein said path means comprises a tubular chamber holding said inertial element and a gas for dampening the movement of said inertial element.

10. A passenger restraint system for a motor vehicle comprising:
   a. an air bag arranged and disposed for restraining a passenger when the motor vehicle experiences a deceleration;
   b. air bag inflating means for inflating said air bag; and c. an accelerometer for sensing said deceleration for activating said air bag inflating means, said accelerometer comprising:
(i) a housing;
(ii) an inertial element disposed in said housing;
(iii) path means for defining a path of movement for said inertial element within said housing; and
(iv) coil spring means disposed in said housing for urging said inertial element toward a first position in the absence of said deceleration, said coil spring means including a first blade disposed in said housing and extending into said path.

11. The system of claim 10 further comprising a contact means disposed within said housing for contacting first blade as said inertial element moves from said first to a second position along said path.

12. The system of claim 11 wherein said contacting means comprises a second blade.

13. The system of claim 10 wherein said path means consists of a plurality of ribs extending within said housing.

14. The system of claim 13 wherein said ribs define a chamber, wherein said chamber has a lateral slot, and wherein said spring means extends into said chamber through said slot.

* * * * *